(No Model.)
C. A. TUCKER.
Nut Lock.
No. 232,090. Patented Sept. 7, 1880.
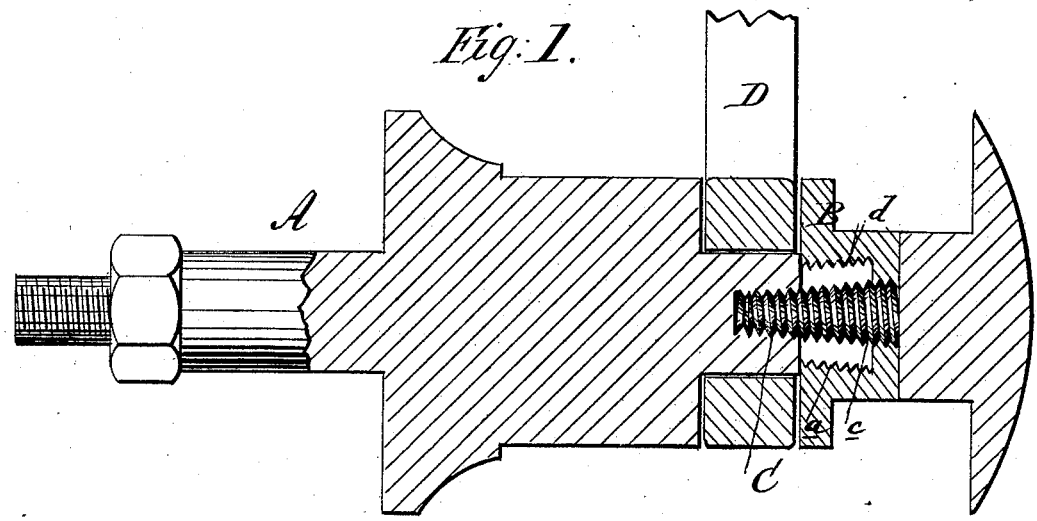
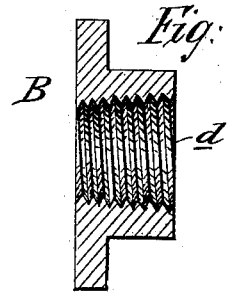
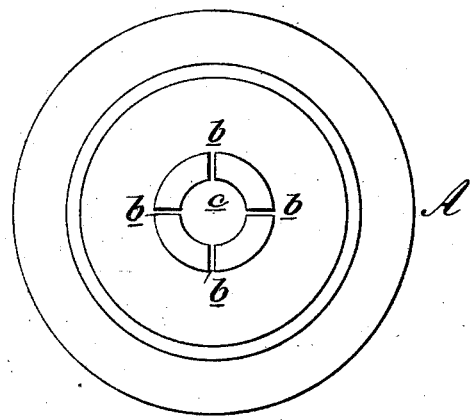
WITNESSES:
A. Schehl.
C. Sedgwick.
INVENTOR:
C. A. Tucker
BY 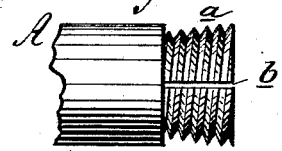
ATTORNEYS.

UNITED STATES PATENT OFFICE.

CHARLES A. TUCKER, OF BROOKLYN, NEW YORK.

NUT-LOCK.

SPECIFICATION forming part of Letters Patent No. 232,090, dated September 7, 1880.

Application filed April 12, 1880. (No model.)

*To all whom it may concern:*

Be it known that I, CHARLES A. TUCKER, of Brooklyn, Kings county, and State of New York, have invented a new and Improved Nut-Lock, of which the following is a specification.

This invention relates to that class of devices designed especially for securing nuts on bridge-bolts, carriage-bolts, and the like.

Figure 1 is an enlarged longitudinal elevation of the device, partly in section. Fig. 2 is an enlarged plan of the split end of the screw-bolt. Fig. 3 is an enlarged longitudinal elevation of a portion of the end of the split screw-bolt; and Fig. 4 is a sectional side elevation of the tapering or conically-tapped nut.

Similar letters of reference indicate corresponding parts.

In the drawings, A represents the screw-bolt provided with screw-threads $a$, with longitudinal cross-cuts $b$ $b$, and with a screw-threaded socket, $c$, in its end. B represents a nut conically tapped, as shown at $d$. C represents the conical or tapering screw.

In the drawings the application of the invention is made to the pivot or prop bolt of a carriage-top, the arm D of the lift being fixed on the shank of the bolt A. The nut B is set over the end of said bolt A and screwed upon the arm D, and then the conical screw C is entered into the socket $c$ of the screw-bolt A and turned down until its shoulder bears upon the upper face of the said nut B, this screw C at the same time forcing the split end of the screw-bolt A open and firmly into the conically-tapped nut B. For still better security of this locking device the screw C and nut B are respectively cut with right and left threads.

A special advantage of the tapering or conically-tapped nut B, in combination with the split screw-bolt A and tapering screw C, shown and described, is that, being tapering or conical, the said nut B bears alike on all the screw-threads of the screw-bolt A when the end of said bolt A is spread open by the tapering screw C, which screw C has the same taper as the said nut B, and thereby a stronger and more unyielding lock is made than would be possible with a nut having a straight bore.

I am aware that is not new to use a conical screw on the end of a split bolt after the nut has been screwed into place; but What I do claim is—

The combination, with a conical end screw, of a shouldered bolt, A, having a threaded socket in a split end and a conically-tapped nut, B, as and for the purpose specified.

CHAS. A. TUCKER.

Witnesses:
I. I. STORER,
JAMES H. HUNTER.